United States Patent

[11] 3,607,036

| [72] | Inventors | Ralph M. Foecking<br>Tampa;<br>Robert D. Austin, Lutz, both of Fla. |
|---|---|---|
| [21] | Appl. No. | 704,358 |
| [22] | Filed | Feb. 9, 1968 |
| [45] | Patented | Sept. 21, 1971 |
| [73] | Assignee | Cities Service Company |

[54] RECOVERY OF SULFUR FROM GYPSUM
5 Claims, 1 Drawing Fig.

[52] U.S. Cl. .................................................. 23/177,
23/181, 23/186
[51] Int. Cl. ..................................................C01b 17/48,
C01b 17/16
[50] Field of Search............................................ 23/177,
186, 181, 178, 134

[56] References Cited
UNITED STATES PATENTS

| 3,129,063 | 4/1964 | Zirngibl......................... | 23/177 |
| 2,893,839 | 7/1959 | Schytil........................... | 23/177 |
| 2,740,691 | 4/1956 | Burwell.......................... | 23/177 X |
| 1,678,630 | 7/1928 | Bahr................................ | 23/177 |
| 616,391 | 12/1898 | De Baranoff et al.......... | 23/134 |

FOREIGN PATENTS

| 694,036 | 7/1953 | England........................ | 23/177 |
| 643,479 | 9/1950 | England........................ | 23/177 |

*Primary Examiner*—Oscar R. Vertiz
*Assistant Examiner*—Charles B. Rodman
*Attorney*—J. Richard Geaman ABSTRACT: The sulfur values are recovered from calcium sulfate principally in the form of sulfur dioxide by a two-stage reduction process. The calcium sulfate to be decomposed and the reducing gases pass countercurrently through the two-stage system in which the solids are maintained in a fluidized state. Temperatures within the range of from about 600° C. to about 900° C. may be employed. Steam may be condensed out of the product gas stream to provide a product gas containing a major proportion of sulfur dioxide and a minor proportion of carbon dioxide. The calcium sulfate is first reduced to calcium sulfide and is then further reduced in the second stage to calcium oxide. Sand may be mixed with the calcium sulfate being decomposed in order to minimize agglomeration of the solids.

PATENTED SEP 21 1971
3,607,036
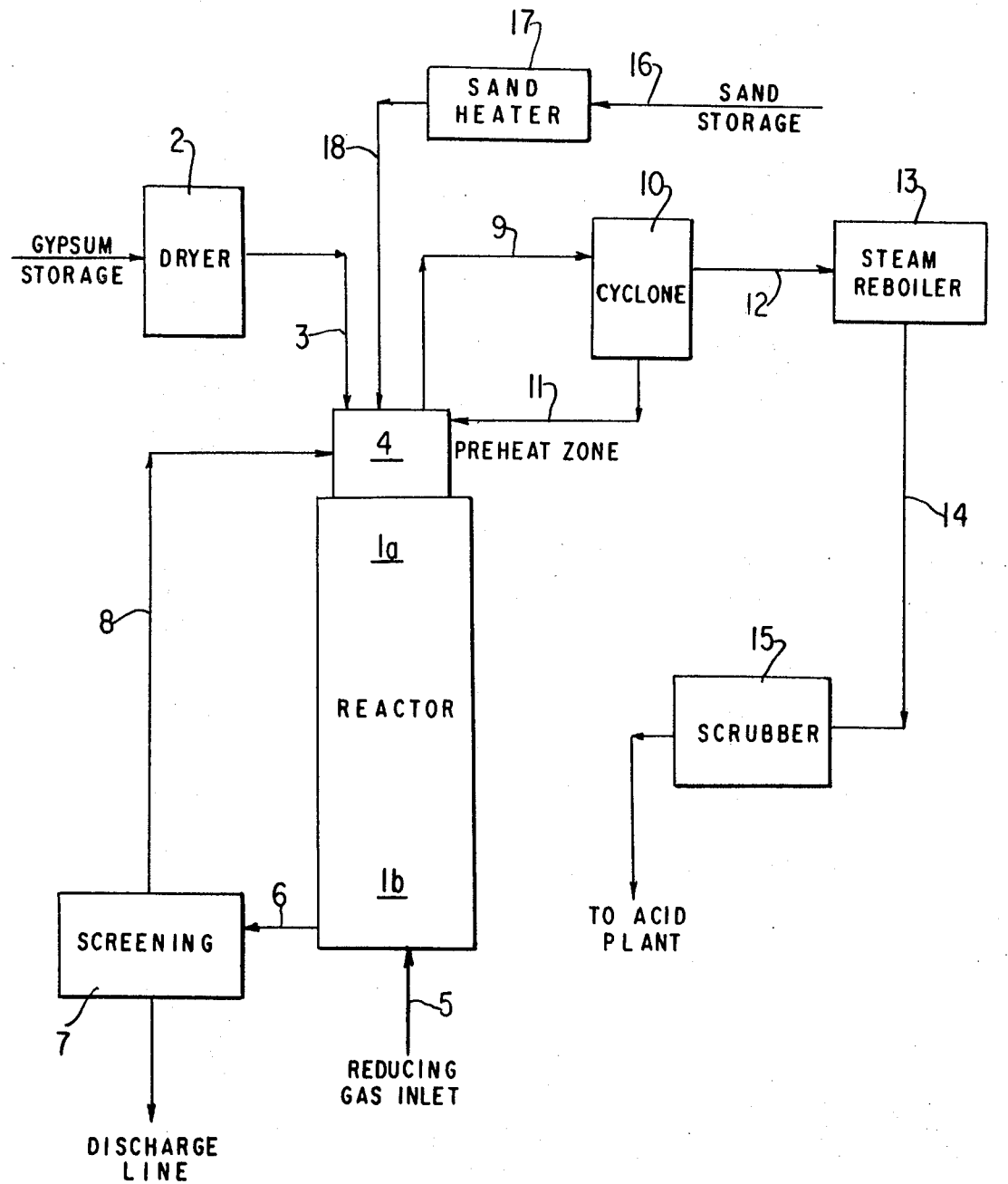
INVENTORS
RALPH M. FOECKING
ROBERT D. AUSTIN
BY
ATTORNEY

3,607,036

RECOVERY OF SULFUR FROM GYPSUM

BACKGROUND OF THE INVENTION

1. Field of the Invention

This invention relates to the recovery of sulfur from gypsum. More particularly, relates to a process for the recovery of the sulfur values from calcium sulfate essentially in the form of sulfur dioxide.

2. Description of the Prior Art

The increasing industrial demands for sulfur have caused a continuing interest in the recovery of the sulfur values from both naturally occurring and byproduct calcium sulfate. Numerous techniques have been proposed for the decomposition of gypsum and anhydrite and the recovery of the sulfur values therefrom. For example, decomposition of gypsum to lime and sulfur dioxide at temperatures of about 1,400° C. has been proposed. Such techniques are generally carried out in rotary kilns or calciners. Such techniques however, generally require relatively long retention times and the use of large size, high-temperature equipment.

Processes have also been proposed in which metallic compounds, carbon and other additives, such as various reducing gases, are added prior to or during decomposition of the calcium sulfate. Such operations have generally required a temperature of at least 1,000° C. and have also had the disadvantage of relatively slow reaction times, e.g. 1–2 hours.

Techniques of this general type are mentioned in the Burwell U.S. Pat. No. 2,740,691. This patent teaches the reduction of gypsum with a reducing gas stream at temperatures of from 890°C. to about 1,000° C. Burwell's process results in the recovery of the sulfur values from the gypsum essentially in the form of hydrogen sulfide. Byproduct lime is also produced. When it is desired to utilize the sulfur values from the gypsum in the production of sulfuric acid, the hydrogen sulfide produced by Burwell must, of course, be processed further in order to obtain the desired $SO_2$ gas stream fed to the acid plant. In addition, the temperature requirements for the Burwell process remain relatively high, although those requirements are less than various alternative processes such as those mentioned above. The Burwell process also has a relatively high hydrocarbon consumption in those instances in which methane is employed as the reducing agent. A mole of methane is consumed for each mole of gypsum decomposed in accordance with the Burwell process.

It is an object of the present invention, therefore, to provide an improved process for the recovery of the sulfur values from gypsum and anhydrite.

It is another object of the present invention to provide the process for the recovery of sulfur from calcium sulfate in the form of sulfur dioxide.

It is another object of the present invention to provide the process for the recovery of the sulfur from calcium sulfate in which the energy requirements are minimized.

It is a further object of the present invention to provide the process for the decomposition of calcium sulfate with minimum consumption of hydrocarbon reducing gas.

With these and other objects in mind, the present invention is hereinafter disclosed with reference to particular embodiments thereof, the novel features of which are set forth in the appended claims.

SUMMARY OF THE INVENTION

The objects of the present invention are accomplished by the novel two-stage process of the present invention in which the sulfur values are recovered from calcium sulfate principally in the form of sulfur oxide. The calcium sulfate is contacted by an ascending stream of reducing gas in a two-stage reactor system. The spacial velocity of the gas stream is sufficient to maintain the solids in a fluid state. In the first stage, part of the calcium sulfate is reduced to calcium sulfide by the hydrogen sulfide content of the gas stream from the second stage. The reducing gases are therein oxidized so that a product gas stream comprising essentially sulfur dioxide, carbon dioxide and water is obtained. By condensing out the stream, a dry product gas containing a major proportion of sulfur dioxide and a minor proportion of carbon dioxide is obtained. This gas stream may be diluted with air and employed in a conventional sulfuric acid plant.

The solid calcium sulfide thus formed in the first stage together with unreacted calcium sulfate are contacted, in the second stage, with a stream of reducing gas and steam also maintained at a sufficient spacial velocity in order to maintain the solids in a fluidized state. In this second stage, the remaining part of the calcium sulfate is reduced to calcium sulfide, which in turn is converted with steam to lime, which is withdrawn as a solid byproduct of the process. The reducing gas is oxidized completely by reaction with the unreacted calcium sulfate. The calcium sulfide reacts with steam to form a hydrogen sulfide rich gas stream that passes to the first stage as previously indicated. A reaction temperature of from about 600° C. to about 900° C. is maintained in each stage. Retention time within the reactor is minimized.

The present invention, therefore, provides for a highly efficient utilization of the reducing values in the gas stream passing through the two-stage system. The overall efficiency of operation can be adversely affected to some limited extent, however, by agglomeration of solids. To minimize the possibility of such undesirable agglomeration, an inert inorganic material may be mixed with the calcium sulfate prior to its treated in the two-stage process of the present invention.

When sulfur is to be recovered from gypsum in accordance with the present invention, the gypsum may be subjected to a preliminary drying operation so that the calcium sulfate is fed as an anhydrite to the first stage of the process of the present invention. By driving off the free water and the water of hydration associated with the gypsum in this preliminary drying operation, the energy requirements within the two-state reduction operation can be correspondingly reduced.

BRIEF DESCRIPTION OF THE DRAWING

The present invention is hereinafter described in further detail with reference to the accompanying drawing illustrating an embodiment of the novel process of the present invention.

DETAILED DESCRIPTION OF THE INVENTION

The present invention provides for the recovery of the sulfur values from calcium sulfate principally in the form of a high concentration of sulfur dioxide in the product gas stream. The calcium sulfate treated may be obtained from naturally occurring deposits of calcium sulfate. The calcium sulfate may also be byproduct material such as that obtained in the production of phosphatic fertilizer compositions by the acidulation of phosphate rock with sulfuric acid. The calcium sulfate may be either in the form of gypsum or anhydrite. When gypsum is employed, it is necessary to dry off not only the free water associated with the wet material, but also to dry off the water of hydration. In order to reduce the size of the reactor required to recover the sulfur values from the gypsum, a preliminary drying operation may be employed in order to dry off the free water and at least a major portion of the water of hydration prior to contacting of the gypsum with a reducing gas. The gypsum may be heated to a temperature within the range of from about 600° C. to about 900° C., conveniently to about 800° C. A separate gypsum heater, such as a fluosolids contacting vessel may be employed or the gypsum may be heated in a preheat zone at the uppermost portion of the reactor system.

Any suitable reducing gas or combination of gases may be employed in the present invention. Examples of suitable reducing gases are hydrogen, carbon monoxide, hydrocarbons such as methane, natural gas, and primary reform gas, i.e. that obtained by steam reform of natural gas or naphtha. Primary reform gas typically has a composition of about 15 percent carbon monoxide, about 6 to 8 percent carbon dioxide, about 0.2–0.3 percent methane, with the remainder being hydrogen.

The reducing gas or gases should, of course, be employed in at least the stoichiometric amount necessary to reduce the desired amount of calcium sulfate. When methane is employed as the reducing gas, either alone or in combination with other reducing gases, the present invention may be carried out by employing approximately 1 mole of methane for each 4 moles of calcium sulfate being reduced. The consumption of methane, therefore, is significantly less that that occurring in various techniques heretofore proposed in which up to 1 mole of methane is required per mole of calcium sulfate being decomposed. Irrespective of the particular reducing gas or combination of gases employed, it is generally desirable to employ a slight excess of the reducing gas or gases in order to assure that the desired reaction is driven to completion.

The gas stream injected into the second stage of the reactor should include steam. The presence of steam tends to facilitate the removal of gaseous reaction products and to assure decomposition of residual calcium sulfide. While the quantity of steam employed is not critical, it is generally desirable to include from about 2 to about 6 moles of steam for each mole of reducing gas, with from about 3 to about 5 moles of steam per mole of reducing gas generally preferred.

As previously indicated, the reduction of the calcium sulfate and the formation of sulfur dioxide is accomplished in a two-stage process. In the first stage, the calcium sulfate and the hydrogen-sulfide-containing gas from the second stage are contacted countercurrently under fluidizing conditions to form a product gas stream containing essentially sulfur dioxide, carbon dioxide, and water. The product gas may be passed through a heat exchange system in order to recover the heat contained therein and may be passed through a water scrubber in order to remove dust and fluorine. The steam can be condensed out so as to give a product gas having a major proportion of sulfur dioxide, as for example, about 80 percent, and a minor proportion of carbon dioxide, as for example on the order of about 20 percent. This product gas stream can thereafter be used in any desired manner, as in the production of sulfuric acid. For this purpose, the gas will generally be diluted with air to a desired $SO_2$ concentration, e.g. from about 12 percent to about 20 percent, for use in an acid plant.

In the first stage, part of the calcium sulfate is reduced to calcium sulfide. This material passes through the second stage countercurrently with respect to the reducing gas pressing upwardly at a sufficient spacial velocity so as to maintain the calcium solids in a fluidizable state. In this second stage, the remaining calcium sulfate is reduced to calcium sulfite, which in turn is converted by steam to calcium oxide. The calcium oxide is withdrawn from the process as a byproduct. At the same time, the reducing gas is oxidized by the calcium sulfate and hydrogen sulfide is formed by reaction between the calcium sulfide and steam. The hydrogen sulfide-containing gas from the second stage is then passed upwardly through the first stage as previously indicated.

During the two-stage process in which the solids are maintained in a fluidized state, it is undesirable that the solids become sticky and agglomerate. In order to minimize the possibility of such agglomeration, an inert inorganic material may be mixed with the calcium sulfate prior to the contacting of the calcium sulfate with the reducing gases as herein provided. In this embodiment, the inert material should preferably be of relatively coarse particle size as very fine particles do not prevent agglomeration as effectively as larger sized particles. While the particle size of the inert inorganic material is not critical, the particles of inert material should be at least about as large as the particle size of the material being treated. Preferably, however, the particle size of the inerts should be predominately larger than the particle size of the gypsum or other calcium-sulfate-containing material.

The gypsum formed in the production of phosphoric acid will commonly have a particle size distribution of about 20 percent + 100 mesh material, about 40 percent + 200–100 mesh material, and about 40 percent –200 mesh material. Naturally occurring gypsum, on the other hand, will ordinarily have a much coarser particle size but will generally be milled to a finer size approximating that indicated above for byproduct gypsum. Fine particle size calcium sulfate is desired so that the particles may have as much surface area as possible in order to enhance the solids/gas reaction of the present invention. In order to effectively preclude any tendency toward agglomeration when calcium sulfate having a particle size range on the order of that indicated above is used, inert inorganic material having a particle size of about +100–8 mesh may conveniently be employed. The use of inert material of this general degree of coarseness also facilitates separation of the inert material from byproduct lime. The inert material may be recycled for admixture with quantities of calcium sulfate to be decomposed.

Any suitable inert inorganic material may be employed in the practice of this embodiment of the present invention. Examples of such material include sand and the lime formed as a byproduct in the present invention. It is also within the scope of this aspect of the present invention to preheat the inert material prior to mixing with the calcium sulfate. In this instance, the inert material also serves as an energy carrier supplying a portion of the heat necessary to carry out the two-stage process of the present invention. While the inert material may be heated to any desired extent consistent with the desired operating conditions and the economics of the process, it is convenient to heat the inert material to a temperature within the range of from about 900° C. and about 1100° C.

Likewise, the quantity of inert material employed is not a critical feature of the present invention. While larger or smaller quantities may be employed, it will generally be convenient to mix from about 50 to about 150 parts of inert material with each 100 parts by weight of calcium sulfate being decomposed.

Any suitable, commercially available process equipment can be employed for carrying out the two-stage process of the present invention. Thus, a single fluidized-bed reactor of sufficient length to accommodate the separate reduction operations referred to above may be employed. Alternately, each stage may be carried out in a separate fluidized-bed reactor. It is also within the scope of the present invention to employ a slowly descending granular bed reactor, such as a multistage, sieve tray column. The reducing gases are caused to flow upwardly through the reactor system at a velocity sufficient to maintain the solids in the reactor system in a fluidized state. Spacial velocities of from about 0.5 to 3.8 feet per second are generally considered suitable for this purpose, with special velocities of from about 0.7 to about 1.8 feet per second being generally preferred.

This invention permits operations at temperatures generally lower than in the methods heretofore proposed by the prior art. Temperatures within the range of from about 600° C. to about 900° C. may be employed, with operations at about 800° C. to about 850° C. being particularly convenient. External heat is supplied through fire tubes passed through the fluidized solids section of the reactor in order to maintain the desired temperature. In addition, it is within the scope of the present invention to preheat the calcium sulfate to the desired reaction temperature in a preheat section of the reactor. As indicated above, additional heat may also be supplied to the reactor by means of preheated inert material in the embodiment in which said material is employed.

The reactions called for by the present invention proceed at a rapid rate, thus permitting very short residence times for the materials in the reactor. While the residence time will vary depending on the size of the reactor system and the quantities of material processed therein, the solids will generally be retained in the reactor section, i.e. in the two-stage reactor system, for a period of time on the order of a half hour to insure complete reduction of the calcium sulfate to lime. The reducing gases and water, and the hydrogen sulfide formed during the reaction, need only a residence time of on the order of from 8 to 10 seconds. In that time, the sulfur dioxide and carbon dioxide product gas stream is formed with only trace quantities of unoxidized reducing values contained therein.

In the embodiment shown in the drawing, the two-stage reaction system is shown as a single column labeled 'Reactor' and designated by numerals 1a and 1b calcium sulfate material, is dried in dryer 2 and passes through line 3 into preheat zone 4 of the reactor 1. Reducing gas is introduced into the bottom of reactor 1 through line 5. The product gas stream leaves reactor 1 through line 9 and passes to cyclone 10, in which solid particles are removed and recycled to reactor 1 through 11. The hot product gas stream then passes through line 12 to steam reboiler 13, in which a portion of its heat content is used to generate steam for use in the process of the present invention and for other general purposes. From steam reboiler 13, the product gas stream passes through line 14 to scrubber 15 for the removal of dust and fluorine. The product gas stream then flows to a sulfuric acid plant, not shown, in which it is dried and converted into sulfuric acid in accordance with conventional procedures well known in the art.

The calcium sulfate being treated in reactor 1 is reduced in the first stage 1a to calcium sulfide that is further reduced to calcium oxide, or lime, in the lower portion 1b of reactor 1. The lime is removed as a byproduct through discharge line 6 to screening in which the coarser sand is separated on a 100 mesh screen and is recycled to reactor preheat zone 4 through line 8. The byproduct lime passing through screening 7 is removed to storage. The byproduct lime may be employed for agricultural purposes or for other purposes in the chemical industry, such as in mortar, plaster, insecticides, refractory bricks, and for many other purposes.

When sand or another inert inorganic material is to be mixed with the calcium sulfate as indicated above, the the sand may be passed through line 16 to sand heater 17. The preheated sand may then be passed through line 18 to the preheat zone 4 of the fluosolids reactor in which it is mixed with the calcium sulfate to be decomposed.

In the practice of the present invention, the gypsum is dried in dryer 2 to remove its free water and at least a portion of its water of hydration. The temperature of the material discharged from dryer 2 may, typically, have a temperature ranging from about 300° C. to about 1,100 C. Although not shown in the drawing, it may be desirable to pass the gases employed in dryer 2 to a cyclone in order to remove all particles of the gypsum that have become entrained in the gas stream.

This separated gypsum material may be added to the bulk of the solid material passing from dryer 2 through line 3 to the reactor. In preheat zone 4 in the uppermost portion of reactor 1, the calcium sulfate material is heated to the desired operating temperature, as for example about 800° C. to about 850° C. The solids then pass slowly downwardly through reactor 1 in which part of the calcium sulfate is first reduced to calcium sulfide and then, in the second stage, is further reduced to a byproduct lime that is discharged from the lower portion of reactor 1 through line 6. The fine fraction lime byproduct may be dumped in storage, while the coarse sand may be recycled to the gypsum feed in preheat zone 4.

During their retention in reactor 1, the solids are maintained in a fluidized state. This is accomplished by passing the stream of reducing gases upwardly through reactor 1 at a sufficient spacial velocity to maintain the solids in a fluidized state.

The product gas stream leaving reactor 1 is conveniently passed through line 9 to cyclone 10 for removal of solids that may be recycled to the reactor through line 11. The product gas stream then passes through a stream reboiler, scrubber, dryer and other preliminary operations that may be desired to enable its use in a sulfuric acid plant or in some other desired application.

As previously indicated, the two-stage process of the present invention may be carried out at temperatures within the range of from about 600° C. to about 900° C. In order to maintain the reactor at the desired temperature within this range, external heat may be supplied through the fire tubes passing through the reactor. By maintaining the desired temperature by external heating in this manner, the reactor need only be of sufficient size to handle the necessary volume of reducing gas and steam, when employed. The efficiency of the reaction, in addition, is not adversely affected by the dilution of the gas stream passing through the reactor with nitrogen or other nonreacting gases that would otherwise be employed to supply the necessary heat in a direct-fired unit.

In another embodiment of the present invention, the lime discharged from reactor 1 may be passed into a third stage prior to screening and discharge to storage. In this third stage, the solids are contacted, countercurrently, with steam in order to convert any remaining calcium sulfide into calcium oxide prior to discharge. The temperature is maintained within the range indicated for the other two sections. The gas stream from this third stage will contain hydrogen sulfide and is passed into the second stage for further use in the manner described above.

Illustrative of the practice of the present invention, gypsum may be dried in a fluidized dryer and discharged as anhydrite at abut 315° C. to the preheat zone of the fluosolids reactor. The thus-dried material can therein then be heated to about 825° C. and mixed with sand. The solids are then made to flow through downcomers to the lower trays of the reactor while being maintained in a fluidized state by an ascending gas stream comprising primary reform gas, containing 5 moles of water per mole of methane. The gypsum is thus reduced to lime, and a product gas stream comprising sulfur dioxide, carbon dioxide, and water, is obtained. On a dry basis, the product gas may comprise about 80 percent $SO_2$ by volume and about 20 percent $CO_2$. The solids are retained in the reactor system for approximately one-half hour. The reducing gases pass upwardly through the system in approximately 10 seconds.

The present invention provides a highly desirable means for recovering the sulfur values from calcium sulfate. The process herein provided may be carried out at relatively low operating temperatures and with relatively short retention times. Highly important operating economics are accomplished by the present invention, therefore, that are of great significance in evaluating the prospects for the commercial recovery of sulfur from gypsum. Moreover, the sulfur may be recovered in a form in which it is readily usable as for the manufacture of sulfuric acid. In view of the growing demand for sulfuric acid for agricultural and other purposes, and especially in view of the growing concern in the industry respecting the economical supply of sulfur to fill this demand, the present invention assumes a primary importance to the agricultural, chemical and related industries.

While the invention has been described herein with respect to particular embodiments thereof, it will be appreciated by those skilled in the art that various changes and modifications can be made therein without departing from the scope of the invention as herein described and as set forth in the accompanying claims.

Therefore, we claim:

1. A two step process for converting calcium sulfate comprising:
   a. treating said calcium sulfate with hydrogen sulfide gas in a first stage therefore to form calcium sulfide and a gas stream containing sulfur dioxide, said treatment being characterized by the absence of added steam;
   b. recovering said sulfur dioxide containing steam;
   c. contacting said calcium sulfide with steam and a gas selected from among hydrogen, carbon monoxide, methane, natural gas, primary reform gas and mixtures thereof, to form calcium oxide and a gas stream containing hydrogen sulfide and
   d. recycling said hydrogen-sulfide-containing gas stream to step a.

2. The process of claim 1 in which the temperature in each stage is maintained at from about 600° C. to about 900° C.

3. The process of claim 1 in which the reducing gases are passed upwardly through each stage at a velocity sufficient to maintain said calcium solids in a fluidized state.

4. The process of claim 1 in which steam is present in step c in an amount of from about 2 to about 6 moles per mole of reducing gas.

5. A process for converting calcium sulfate which comprises:
   a. drying gypsum to a substantially anhydrous form,
   b. contacting the substantially anhydrous gypsum with hydrogen sulfide in a first stage at a temperature of from 600° C. to about 900° C. to form calcium sulfide and a gas stream containing sulfur dioxide,
   c. recovering the sulfur-dioxide-containing gas stream,
   d. contacting said calcium sulfide with gas selected from the group consisting of hydrogen, carbon monoxide, methane, natural gas, primary reform gas and mixtures thereof, and from about 2 to 6 moles of steam per mole of said gas in a second stage at a temperature of from 600° C. to 900° C. to form calcium oxide and a hydrogen-sulfide-containing gas stream,
   e. recovering said hydrogen-sulfide-containing gas stream and recycling said hydrogen sulfide stream for use in said first stage.